United States Patent
Cai et al.

(10) Patent No.: US 9,832,115 B2
(45) Date of Patent: Nov. 28, 2017

(54) LABEL-SWITCHED PACKETS WITH DEVICE-INDEPENDENT LABELS

(71) Applicants: Dezhong Cai, San Jose, CA (US); Clarence Filsfils, Brussels (BE); Simon James Trevor Spraggs, Hayling Island (GB)

(72) Inventors: Dezhong Cai, San Jose, CA (US); Clarence Filsfils, Brussels (BE); Simon James Trevor Spraggs, Hayling Island (GB)

(73) Assignee: Cisco Technology, Inc., San Jose, CA (US)

( * ) Notice: Subject to any disclaimer, the term of this patent is extended or adjusted under 35 U.S.C. 154(b) by 5 days.

(21) Appl. No.: 14/527,025

(22) Filed: Oct. 29, 2014

(65) Prior Publication Data
US 2016/0127225 A1 May 5, 2016

(51) Int. Cl.
*H04L 12/723* (2013.01)
*H04L 12/715* (2013.01)

(52) U.S. Cl.
CPC .............. *H04L 45/50* (2013.01); *H04L 45/04* (2013.01)

(58) Field of Classification Search
CPC ..... H04L 45/04; H04L 45/50; H04L 12/5689; H04L 2012/5668; H04L 12/56; H04L 12/4666; H04L 12/66; H04L 45/507; H04L 45/00; H04L 12/4633
See application file for complete search history.

(56) References Cited

U.S. PATENT DOCUMENTS

| 7,082,140 B1 * | 7/2006 | Hass ..................... H04L 49/602 370/466 |
| 7,308,446 B1 | 12/2007 | Panigrahy et al. |
| 8,259,564 B1 | 9/2012 | Gredler et al. |

(Continued)

OTHER PUBLICATIONS

Communication of the Extended European Search Report, dated Mar. 24, 2016, EP Application 15189215.5, European Patent Office, Munich, Germany, (seven pages).

(Continued)

*Primary Examiner* — Charles C Jiang
*Assistant Examiner* — Rose Clark
(74) *Attorney, Agent, or Firm* — The Law Office of Kirk D. Williams (57) ABSTRACT

In one embodiment, a device-independent label is associated with multiple network devices such that the packet switching devices in a network will forward a packet based on the device-independent label to one of these multiple network devices. In one embodiment, these device-independent labels include, but are not limited to, domain-identifying labels and forwarding-punt labels. In one embodiment, a domain-identifying label is defined as a label that identifies a plurality of network nodes without identifying a single particular network node, single particular interface, nor single particular link. In one embodiment, a first-domain forwarding-punt label is placed at the top of the label stack to identify to forward the label-switched packet to any one of a plurality of designated forwarding nodes corresponding to the first-domain forwarding-punt label (e.g., for sending to a packet switching device which will have forwarding information for the second domain-identifying label).

17 Claims, 4 Drawing Sheets

(56) References Cited

U.S. PATENT DOCUMENTS

| | | | | |
|---|---|---|---|---|
| 8,611,359 | B1* | 12/2013 | Kompella | H04L 45/04 370/401 |
| 8,619,799 | B1* | 12/2013 | Thodupunoori | H04W 68/02 370/338 |
| 8,798,055 | B1* | 8/2014 | An | H04L 49/604 370/390 |
| 2006/0262735 | A1 | 11/2006 | Guichard et al. | |
| 2007/0207591 | A1* | 9/2007 | Rahman | H04L 45/00 438/439 |
| 2009/0238084 | A1* | 9/2009 | Nadeau | H04L 43/10 370/248 |
| 2010/0040061 | A1* | 2/2010 | McGuire | H04L 12/4633 370/392 |
| 2011/0075549 | A1* | 3/2011 | Lu | G06F 11/1415 370/216 |
| 2013/0089093 | A1* | 4/2013 | Bacthu | H04L 12/4633 370/390 |
| 2014/0169370 | A1 | 6/2014 | Filsfils et al. | |
| 2014/0269699 | A1 | 9/2014 | Filsfils et al. | |
| 2014/0280717 | A1 | 9/2014 | Frost et al. | |
| 2014/0334286 | A1* | 11/2014 | Ernstrom | H04L 45/04 370/216 |
| 2015/0188826 | A1* | 7/2015 | Thodupunoori | H04L 47/24 370/392 |
| 2016/0036695 | A1* | 2/2016 | Mirsky | H04L 45/507 370/243 |

OTHER PUBLICATIONS

D. Haskin, "Default Route Advertisement in BGP2 and BGP3 Versions of the Border Gateway Protocol," RFC 1397, The Internet Society, Reston, VA, USA (two pages).

Rekhter and Rosen, "Carrying Label Information in BGP-4," RFC 3107, May 2001, The Internet Society, Reston, VA, USA (eight pages).

Draves and Thaler, "Default Router Preferences and More-Specific Routes," RFC 4191, Nov. 2005, The Internet Society, Reston, VA, USA (fifteen pages).

D. Farinacci et al., "The Locator/ID Separation Protocol (LISP)," RFC 6830, Jan. 2013, The Internet Society, Reston, VA, USA (seventy-five pages).

* cited by examiner

LABEL-SWITCHED PACKETS WITH DEVICE-INDEPENDENT LABELS

TECHNICAL FIELD

The present disclosure relates generally to processing (e.g., manipulating, dropping, forwarding) label-switched packets in a communications network, including label-switched packets with device-independent labels.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology, which may include label-switching technology.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with label-switched packets with device-independent labels, such as, but not limited to, domain-identifying and forwarding-punt labels.

One embodiment performs operations, including: identifying, by a network node located in a first domain, a label-switched packet to be sent; and sending, from the network node, the label-switched packet including a label stack identifying forwarding information for the label-switched packet with the label stack including a second domain-identifying label that identifies a second domain of a plurality of second-domain network nodes. In one embodiment, a domain-identifying label is defined as a label that identifies a plurality of network nodes without identifying a single particular network node, single particular interface, nor single particular link. In one embodiment, a first-domain forwarding-punt label is placed at the top of the label stack to identify to forward the label-switched packet to any one of a plurality of designated forwarding nodes corresponding to the first-domain forwarding-punt label (e.g., for sending to a packet switching device which will have forwarding information for the second domain-identifying label).

In one embodiment, the second domain is an Interior Gateway Protocol (IGP) area. In one embodiment, the second domain is a Border Gateway Protocol Autonomous System. In one embodiment, the second domain is a geographic area. In one embodiment, the first domain and the second domain are in different administrative domains.

One embodiment includes a packet switching device, comprising: one or more processors; memory; a plurality of interfaces configured to send and receive packets; and one or more packet switching mechanisms configured to packet switch packets among said interfaces. In one embodiment, said packet switching device is located in a first domain and configured to perform operations, including: receiving a label-switched packet including a label stack; and in response to a top label of the label stack being a first-domain forwarding-punt label and a next label in the label stack being a second domain-identifying label that identifies a second domain of a plurality of network nodes or in response to the top label of the label stack being the second domain-identifying label, forwarding the label switched packet without the first-domain forwarding-punt label to one of a plurality of second domain border packet switching devices in the second domain, wherein the second domain-identifying label represents the plurality of second domain border packet switching devices; and wherein the first-domain forwarding-punt label identifies a plurality of designated forwarding nodes with forwarding information for the label-switched packet.

One embodiment performs operations, including: receiving, by a packet switching device located in a first domain, a label-switched packet including a label stack; and in response to a top label of the label stack being a first-domain forwarding-punt label and a next label in the label stack being a second domain-identifying label that identifies a second domain of a plurality of network nodes or in response to the top label of the label stack being the second domain-identifying label, forwarding the label switched packet without the first-domain forwarding-punt label to one of a plurality of second domain border packet switching devices in the second domain, wherein the second domain-identifying label represents the plurality of second domain border packet switching devices; and wherein the first-domain forwarding-punt label identifies a plurality of designated forwarding nodes with forwarding information for the label-switched packet.

One embodiment performs operations, including: receiving, by a packet switching device located in a first domain from a second domain packet switching device located in a second domain, a label-switched packet including a label stack; and in response to a top label of the label stack being a third domain-identifying label that identifies a third domain of a plurality of network nodes, forwarding the label switched packet with the third domain-identifying label as the top label in the label stack through one or more additional packet switching devices in the first domain and then sending from a particular first domain packet switching device in the first domain to a third domain packet switching device in the third domain.

2. Description

Disclosed are, inter alia, methods, apparatus, computer-storage media, mechanisms, and means associated with label-switched packets with device-independent labels. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Figure 1A:
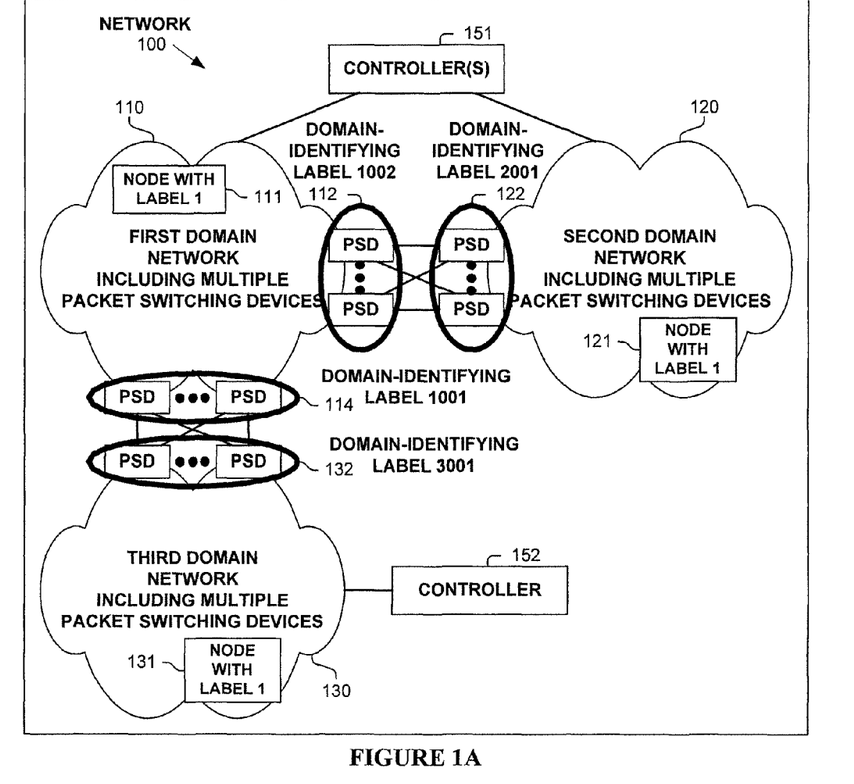
FIG. 1A illustrates a network operating according to one embodiment.

FIG. 1A illustrates a network 100 operating according to one embodiment. Shown are three network domains 110, 120 and 130, which typically have different scopes for evaluating labels of label-switched packets. In one embodiment, a domain is an Interior Gateway Protocol (IGP) area. In one embodiment, a domain is a Border Gateway Protocol Autonomous System. In one embodiment, a domain is a geographic area. In one embodiment, a domain is a set of network nodes under control of an administrative entity.

As shown in FIG. 1A, first domain network 110 includes multiple network nodes (e.g., packet switching devices, host devices), including node 111 assigned label 1, gateway packet switching devices 114 identified by domain-identifying label 1001 coupled to third domain network 130, and gateway packet switching devices 112 identified by domain-identifying label 1002 coupled to second domain network 120.

Second domain network 120 includes multiple network nodes (e.g., packet switching devices, host devices), including node 121 assigned label 1, and gateway packet switching devices 122 identified by domain-identifying label 2001 coupled to first domain network 110.

Third domain network 130 includes multiple network nodes (e.g., packet switching devices, host devices), including node 131 assigned label 1, and gateway packet switching devices 132 identified by domain-identifying label 3001 coupled to first domain network 110.

In one embodiment, one or more controllers 151, 152 are coupled to one or more domain networks 110, 120, 130 to provide forwarding information to nodes. These controllers 151, 152 can provide forwarding information, including labels and/or complete label stacks to network nodes for use in sending label-switched packets.

In one embodiment, some network nodes (including packet switching devices) are of a limited capability such that they may only be able to process a small label stack (e.g., two or three labels) and/or have limited forwarding information.

One embodiment uses device-independent labels, typically in addition to normal Multiprotocol Label Switching (MPLS) labels and/or Segment Routing Labels.

One embodiment uses device-independent labels in the form of domain-identifying labels that identify a domain to which to forward a label-switched packet. In one embodiment, network nodes in first domain network 110 and third domain network 130 use second-domain-identifying label 2001 to cause a packet to reach second domain 120, and in particular in one embodiment, to one of gateway packet switching devices 122. By using a domain-identifying label to refer to a plurality of gateway packet switching devices (e.g., 122, 112, 114, 132), one embodiment provides a mechanism to reach a corresponding domain using a single label. Also, because the same domain-identifying label refers to multiple devices, the same domain-identifying label is used whether or not one or more of the gateway packet switching devices are unreachable. Thus, one embodiment avoids having to use different labels for each gateway packet switching device and adjusting the label according to network conditions.

Figure 1B:
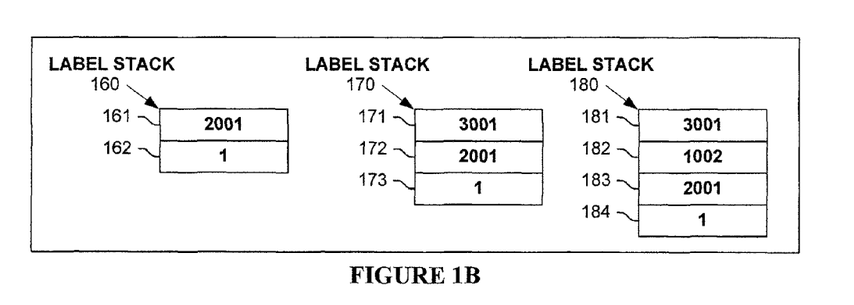
FIG. 1B illustrates one or more label stacks of packets according to one embodiment.

FIG. 1B illustrates label stack 160 used in one embodiment. As shown in FIGS. 1A-B, label stack 160 includes domain-identifying label 2001 (161) identifying second domain network 120 and destination label 1 (162) identifying network node 121. In one embodiment, a label-switched packet having label stack 160 is forwarded through first domain network 110 and possibly through third domain network 130 to one of multiple packet switching devices 122 associated with domain identifying label 2001 (161). The receiving packet switching device 122 pops label 161 revealing label 1 (162) which is evaluated within second-domain forwarding information and forwarded to network node 121.

FIG. 1B illustrates label stack 170 used in one embodiment. As shown in FIGS. 1A-B, label stack 170 includes domain-identifying label 3001 (171) identifying gateway packet switching devices 132 of third domain network 130, domain-identifying label 2001 (172) identifying second domain network 120, and destination label 1 (162) identifying network node 121. In one embodiment, a label-switched packet having label stack 170 within third domain network 130 is forwarded to one of gateway packet switching devices 132. The receiving packet switching device 132 pops label 171 revealing domain-identifying label 2001 (172). The label-switched packet is forwarded through first domain network 110 and to one of multiple packet switching devices 122 associated with domain identifying label 2001 (172). The receiving packet switching device 122 pops label 172 revealing label 1 (173) which is evaluated within second-domain forwarding information and forwarded to network node 121.

FIG. 1B illustrates label stack 180 used in one embodiment. As shown in FIGS. 1A-B, label stack 180 includes domain-identifying labels 181-183 and destination label 1 (184) identifying network node 121. In one embodiment, a label-switched packet having label stack 180 within third domain network 130 is forwarded to one of gateway packet switching devices 132 associated with domain-identifying label 3001 (181). The receiving packet switching device 132 pops label 181 revealing domain-identifying label 1002 (182). The label-switched packet is forwarded through first domain network 110 and to one of multiple packet switching devices 112 associated with domain identifying label 1002 (182). The receiving packet switching device 112 pops label 182 revealing domain-identifying label 2001 (183). The label-switched packet is forwarded to one of multiple packet switching devices 122 associated with domain identifying label 2001 (183). The receiving packet switching device 122 pops label 183 revealing label 1 (184) which is evaluated within second-domain forwarding information and forwarded to network node 121.

As illustrated in FIGS. 1A-1B, a packet is forwarded to its proper destination using one or more domain-identifying labels and a destination label. The use of multiple domain-identifying labels defines a more explicit path to be taken by the label-switched packet, rather than leaving more forwarding flexibility with packet switching devices within a network.

Figure 2A:
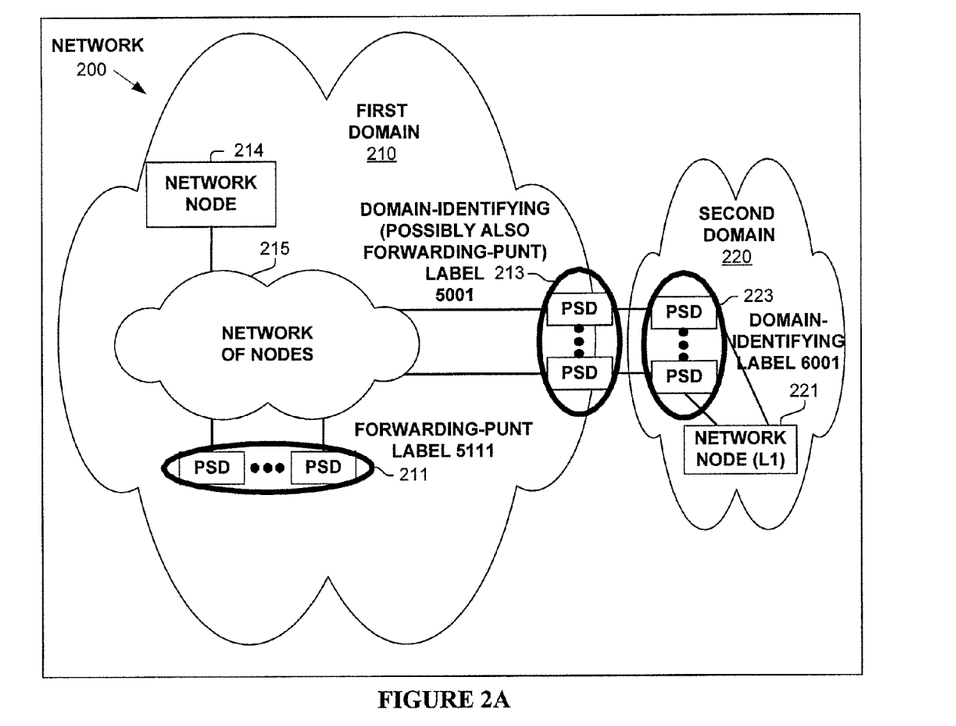
FIG. 2A illustrates a network operating according to one embodiment.

FIG. 2A illustrates a network 200 operating according to one embodiment. Shown are two network domains 210 and 220, which typically have different scopes for evaluating labels of label-switched packets. In one embodiment, a domain is an Interior Gateway Protocol (IGP) area. In one embodiment, a domain is a Border Gateway Protocol Autonomous System. In one embodiment, a domain is a geographic area. In one embodiment, a domain is a set of network nodes under control of an administrative entity.

As shown in FIG. 2A, first domain network 210 includes multiple network nodes 211, 213, 214, 215 (e.g., packet switching devices, host devices), gateway packet switching devices 213 identified by domain-identifying label (and possibly forwarding-punt label) 5001 coupled to second domain network 220, and packet switching devices 211 identified by forwarding-punt label 5111. Also as shown, second domain network 220 includes multiple network nodes (e.g., packet switching devices, host devices), including node 221 assigned label 1, and gateway packet switching devices 223 identified by domain-identifying label 6001.

In one embodiment, a forwarding-punt label is used to identify to send the packet to a node which has forwarding and/or other packet processing capability. In one embodiment, a reduced-capability network node does not have full forwarding information, but is capable of sending a packet to a neighboring node. A forwarding-punt label is used to identify to send the packet to a network node (e.g., packet switching device, host device) that is capable of removing the forwarding-punt label and then forwarding the packet according to another label in the label stack of the packet (or possibly converting the packet to another protocol type such as Internet Protocol and forwarding the packet). In one embodiment, a node receives forwarding information, possibly even a pre-defined label stack to use, from a network controller or other system (e.g., network management system, or operating control system).

In one embodiment, domain-identifying labels and forwarding-punt labels have a type field identifying whether the particular label is a domain-identifying label and/or a forwarding-punt label and/or a different type of label.

Figure 2B:
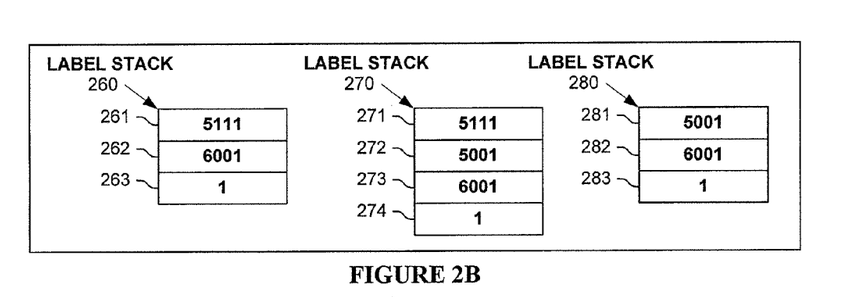
FIG. 2B illustrates one or more label stacks of packets according to one embodiment.

FIG. 2B illustrates label stack 260 used in one embodiment. As shown in FIGS. 2A-B, label stack 260 includes forwarding-punt label 5111 (261), second-domain-identifying label 6001 (262) identifying second domain network 220 (in particular gateway packet switching devices 223) and destination label 1 (263) identifying network node 221. In one embodiment, a label-switched packet having label stack 260 is forwarded within first domain network 210 to one of nodes 211. The receiving packet switching device 211 pops label 261 revealing domain-forwarding label 6001 (262), which causes the packet to be forwarded to second domain 220, and in particular, to one of gateway packet switching devices 223. The receiving packet switching device 223 pops label 262 revealing label 1 (263) which is evaluated within second-domain forwarding information and forwarded to network node 221.

FIG. 2B illustrates label stack 270 used in one embodiment. As shown in FIGS. 2A-B, label stack 270 includes forwarding-punt label 5111 (271), first-domain-identifying label 5001 (272) identifying gateway packet switching devices 213, second-domain-identifying label 6001 (273) identifying second domain network 220 (in particular gateway packet switching devices 223) and destination label 1 (274) identifying network node 221. In one embodiment, a label-switched packet having label stack 270 is forwarded within first domain network 210 to one of nodes 211. The receiving packet switching device 211 pops label 271 revealing first-domain-identifying label 5001 (272) of gateway devices 213, and then forwards the packet to one of gateway devices 213. The receiving packet switching device 213 pops label 272 revealing domain-forwarding label 6001 (273), which causes the packet to be forwarded to second domain 220, and in particular, to one of gateway packet switching devices 223. The receiving packet switching device 223 pops label 273 revealing label 1 (274) which is evaluated within second-domain forwarding information and forwarded to network node 221.

FIG. 2B illustrates label stack 280 used in one embodiment. In one embodiment, gateway packet switching devices 213 also have forwarding information such that label 5001 is both a first-domain-identifying label and a forwarding-punt label. As shown in FIGS. 2A-B, label stack 280 includes forwarding-punt label/gateway first-domain-identifying label 5001 (281), second-domain-identifying label 6001 (282) identifying second domain network 220 (in particular gateway packet switching devices 223) and destination label 1 (283) identifying network node 221. In one embodiment, a label-switched packet having label stack 280 is forwarded within first domain network 210 to one of nodes 213. The receiving packet switching device 213 pops label 281 revealing domain-forwarding label 6001 (282), which causes the packet to be forwarded to second domain 220, and in particular, to one of gateway packet switching devices 223. The receiving packet switching device 223 pops label 282 revealing label 1 (283) which is evaluated within second-domain forwarding information and forwarded to network node 221.

Figure 3A:
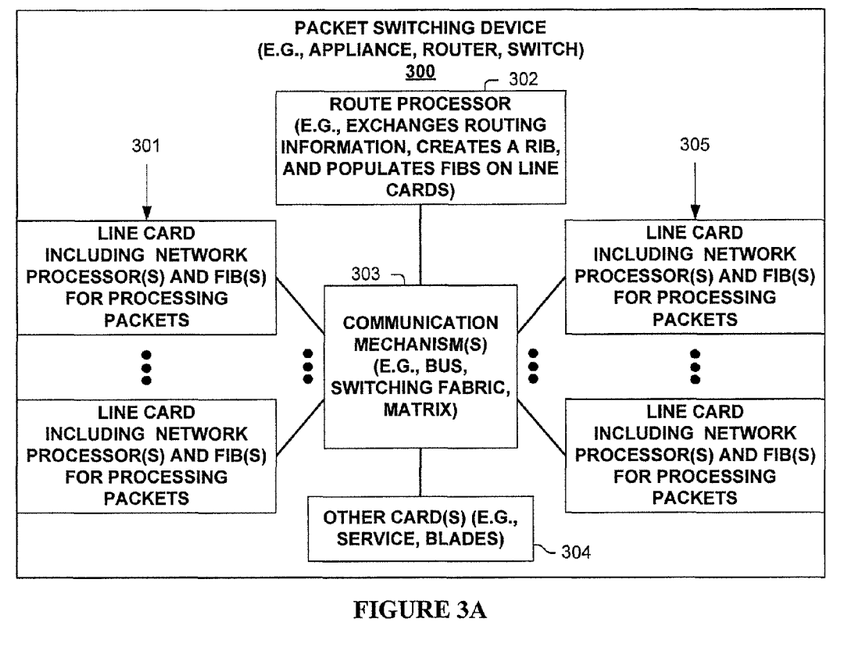
FIG. 3A illustrates a packet switching device according to one embodiment.

One embodiment of a packet switching device 300 is illustrated in FIG. 3A. As shown, packet switching device 300 includes multiple line cards 301 and 305, each with one or more network interfaces for sending and receiving packets over communications links (e.g., possibly part of a link aggregation group), and with one or more processing elements that are used in one embodiment associated with label-switched packets with device-independent labels. Packet switching device 300 also has a control plane with one or more processing elements 302 for managing the control plane and/or control plane processing of packets associated with label-switched packets with device-independent labels. Packet switching device 300 also includes other cards 304 (e.g., service cards, blades) which include processing elements that are used in one embodiment to process packets associated with label-switched packets with device-independent labels, and some communication mechanism 303 (e.g., bus, switching fabric, matrix) for allowing its different entities 301, 302, 304 and 305 to communicate.

Line cards 301 and 305 typically perform the actions of being both an ingress and egress line card, in regards to multiple other particular packets and/or packet streams being received by, or sent from, packet switching device 300. In one embodiment, line cards 301 and/or 305 perform address matching on forwarding information bases (FIBs) to determine how to ingress and/or egress process packets. Even though the term FIB includes the word "forwarding," this information base typically includes other information describing how to process corresponding packets.

Figure 3B:
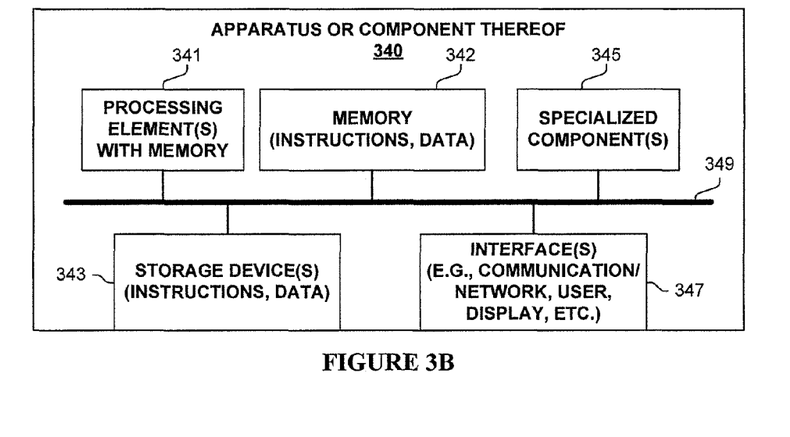
FIG. 3B illustrates an apparatus according to one embodiment.

FIG. 3B is a block diagram of an apparatus 340 used in one embodiment associated with label-switched packets with device-independent labels. In one embodiment, apparatus 340 performs one or more processes, or portions thereof, corresponding to one of the flow diagrams illustrated or otherwise described herein, and/or illustrated in another diagram or otherwise described herein.

In one embodiment, apparatus 340 includes one or more processing element(s) 341 (typically with on-chip memory), memory 342, storage device(s) 343, specialized component(s) 345 (e.g. optimized hardware such as for performing lookup and/or packet processing operations, etc.), and interface(s) 347 for communicating information (e.g., sending and receiving packets, user-interfaces, displaying information, etc.), which are typically communicatively coupled via one or more communications mechanisms 349, with the communications paths typically tailored to meet the needs of a particular application.

Various embodiments of apparatus 340 may include more or fewer elements. The operation of apparatus 340 is typically controlled by processing element(s) 341 using memory 342 and storage device(s) 343 to perform one or more tasks or processes. Memory 342 is one type of computer-readable/computer-storage medium, and typically comprises random access memory (RAM), read only memory (ROM), flash memory, integrated circuits, and/or other memory components. Memory 342 typically stores computer-executable instructions to be executed by processing element(s) 341 and/or data which is manipulated by processing element(s) 341 for implementing functionality in accordance with an embodiment. Storage device(s) 343 are another type of computer-readable medium, and typically comprise solid state storage media, disk drives, diskettes, networked services, tape drives, and other storage devices. Storage device(s) 343 typically store computer-executable instructions to be executed by processing element(s) 341 and/or data which is manipulated by processing element(s) 341 for implementing functionality in accordance with an embodiment.

Figure 4:
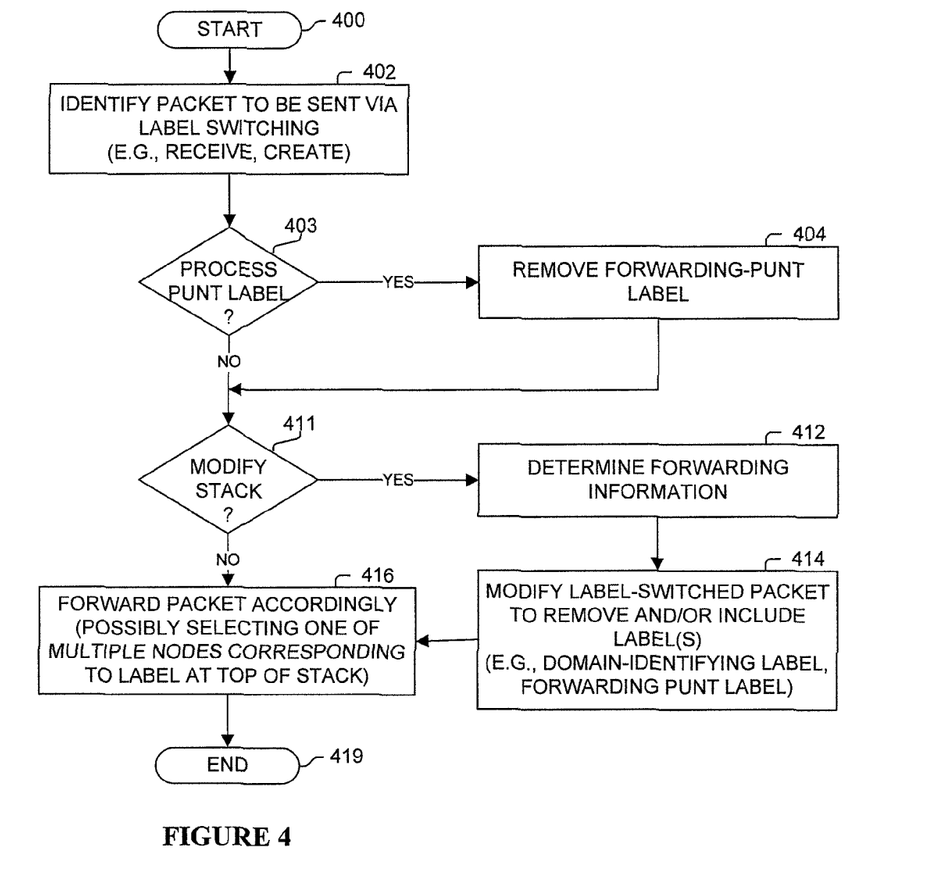
FIG. 4 illustrates processes according to one embodiment.

FIG. 4 illustrates a process performed in one embodiment. Processing begins with process block 400. In process block 402, a packet is identified (e.g., received, created, selected) to be sent via label switching.

As determined in process block 403, if the packet was received with a punt-forwarding label as the top label in the label stack of the received packet and this process is being performed by a device that can perform the punt-forwarding label processing, then in process block 404 the forwarding-punt label is popped from the label stack as this node has processing/forwarding information for the packet. Processing proceeds to process block 411.

As determined in process block 411, if the label stack of the packet is to be modified, then processing proceeds to process block 412, otherwise processing proceeds directly to process block 416. In process block 412, forwarding information is determined for the packet (e.g., based on the top label). In process block 414, the label stack of the label-switched packet is updated accordingly, which may include, but is not limited to, adding, removing and/or modifying labels in the label stack.

Processing proceeds to process block 416, wherein the packet is forwarded accordingly, which may include, but is not limited to, selecting a node corresponding to a forwarding-punt label or domain-identifying label referring to multiple network nodes. Processing of the flow diagram of FIG. 4 is complete as determined by process block 419.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:
1. A method, comprising:
identifying, by a network node located in a first domain, a label-switched packet to be sent;
sending, from the network node, the label-switched packet including a label stack identifying forwarding information for the label-switched packet with the label stack including a second domain-identifying label that identifies a second domain of a plurality of second-domain network nodes; and responsive to receiving the label-switched packet by a second border packet switching device in the second domain, the second border packet switching device removing the second domain-identifying label and forwarding the label-switched packet according to another label in the label stack;

wherein a domain-identifying label is defined as a label that identifies a plurality of network nodes without identifying a single particular network node, single particular interface, nor single particular link.

2. The method of claim 1, wherein the second domain is an Interior Gateway Protocol (IGP) area.

3. The method of claim 1, wherein the second domain is a Border Gateway Protocol Autonomous System.

4. The method of claim 1, wherein the second domain is a geographic area.

5. The method of claim 1, wherein the first domain and the second domain are in different administrative domains.

6. The method of claim 1, wherein the second domain-identifying label is the label at the top of the label stack when the label-switched packet is said sent from the network node; and wherein said sending the label-switched packet includes forwarding the label-switched packet to another network node in the first domain.

7. A method, comprising:
identifying, by a network node located in a first domain, a label-switched packet to be sent; and sending, from the network node, the label-switched packet including a label stack identifying forwarding information for the label-switched packet with the label stack including a second domain-identifying label that identifies a second domain of a plurality of second-domain network nodes;

wherein a domain-identifying label is defined as a label that identifies a plurality of network nodes without identifying a single particular network node, single particular interface, nor single particular link; and wherein the second domain-identifying label is a label after a top label at the top of the label stack when the label-switched packet is said sent from the network node; wherein said sending the label-switched packet includes forwarding the label-switched packet to another network node in the first domain; and wherein the top label is a first-domain forwarding-punt label identifying to forward the label-switched packet to any one of a plurality of designated forwarding nodes corresponding to the first-domain forwarding-punt label.

8. The method of claim 7, wherein each of the plurality of designated forwarding nodes is a node within the first domain that has a forwarding information base that includes information for forwarding packets based on the second domain-identifying label; and wherein each of a plurality of first-domain network nodes within the first domain do not have a forwarding information base that includes information for forwarding packets based on the second domain-identifying label.

9. The method of claim 7, wherein each of the plurality of designated forwarding nodes is a border packet switching device within the first domain directly communicatively coupled to one or more border packet switching devices in a different domain.

10. The method of claim 1, comprising receiving, by the network node, the label-switched packet with the label stack.

11. The method of claim 1, comprising building, by the network node, the label stack for the label-switched packet.

12. A method, comprising:
identifying, by a network node located in a first domain, a label-switched packet to be sent; and sending, from the network node, the label-switched packet including a label stack identifying forwarding information for the label-switched packet with the label stack including a second domain-identifying label that identifies a second domain of a plurality of second-domain network nodes;

wherein a domain-identifying label is defined as a label that identifies a plurality of network nodes without identifying a single particular network node, single particular interface, nor single particular link;

wherein the second domain-identifying label identifies a plurality of second domain border packet switching devices in the second domain to which to send the label-switched packet; and wherein the method includes selecting a particular second domain border packet switching device of the plurality of second domain border packet switching devices by a packet switching node in the first domain, and sending the label-switched packet including the second domain-identifying label to said selected particular second domain border packet switching device.

13. A method, comprising:
identifying, by a network node located in a first domain, a label-switched packet to be sent;

sending, from the network node, the label-switched packet including a label stack identifying forwarding information for the label-switched packet with the label stack including a second domain-identifying label that identifies a second domain of a plurality of second-domain network nodes; and responsive to receiving the label-switched packet by a second packet switching device in the second domain, the second border packet switching device converting the label-switched packet to an Internet Protocol (IP) packet and forwarding the IP packet;

wherein a domain-identifying label is defined as a label that identifies a plurality of network nodes without identifying a single particular network node, single particular interface, nor single particular link.

14. A packet switching device, comprising:
one or more processors;
memory;
a plurality of interfaces that send and receive packets; and
one or more packet switching mechanisms that packet switch packets among said interfaces;
wherein said packet switching device is located in a first domain and that performs operations, including:
receiving a label-switched packet including a label stack; and
in response to a top label of the label stack being a first-domain forwarding-punt label and a next label in the label stack being a second domain-identifying label that identifies a second domain of a plurality of network nodes, or in response to the top label of the label stack being the second domain-identifying label, forwarding the label switched packet without the first-domain forwarding-punt label to one of a plurality of second domain border packet switching devices in the second domain, wherein the second domain-identifying label represents the plurality of second domain border packet switching devices; and wherein the first-domain forwarding-punt label identifies a plurality of designated forwarding nodes with forwarding information for the label-switched packet.

15. The packet switching device of claim 14, wherein said operations include: receiving a second label-switched packet from a node within the second domain with the second label-switched packet including a label stack with a first domain-identifying label at the top of the label stack of the second label-switched packet; and forwarding the second label-switched packet to a particular node in the first domain in response to removing the first domain-identifying label from the label stack of the second label-switched packet to expose a label corresponding to the particular node.

16. A method, comprising:
receiving, by a packet switching device located in a first domain, a label-switched packet including a label stack;
in response to a top label of the label stack being a first-domain forwarding-punt label and a next label in the label stack being a second domain-identifying label that identifies a second domain of a plurality of network nodes, or in response to the top label of the label stack being the second domain-identifying label, forwarding the label switched packet without the first-domain forwarding-punt label to one of a plurality of second domain border packet switching devices in the second domain, wherein the second domain-identifying label represents the plurality of second domain border packet switching devices; and wherein the first-domain forwarding-punt label identifies a plurality of designated forwarding nodes with forwarding information for the label-switched packet.

17. The method of claim 16, comprising: receiving, by the packet switching device, a second label-switched packet from a node within the second domain with the second label-switched packet including a label stack with a first domain-identifying label at the top of the label stack of the second label-switched packet; and
forwarding, by the packet switching device, the second label-switched packet to a particular node in the first domain in response to removing the first domain-identifying label from the label stack of the second label-switched packet to expose a label corresponding to the particular node.

\* \* \* \* \*